US012780167B2

(12) United States Patent
Kojima

(10) Patent No.: US 12,780,167 B2
(45) Date of Patent: Nov. 3, 2026

(54) ELECTRIC BRAKING DEVICE

(71) Applicant: ADVICS CO., LTD., Kariya (JP)

(72) Inventor: Shinichiro Kojima, Kariya (JP)

(73) Assignee: ADVICS CO., LTD., Kariya (JP)

( * ) Notice: Subject to any disclaimer, the term of this patent is extended or adjusted under 35 U.S.C. 154(b) by 0 days.

(21) Appl. No.: 19/150,096

(22) PCT Filed: Jan. 24, 2024

(86) PCT No.: PCT/JP2024/002045
§ 371 (c)(1),
(2) Date: Jul. 22, 2025

(87) PCT Pub. No.: WO2024/158005
PCT Pub. Date: Aug. 2, 2024

(65) Prior Publication Data
US 2026/0225567 A1 Aug. 6, 2026

(30) Foreign Application Priority Data
Jan. 27, 2023 (JP) ................................ 2023-011001

(51) Int. Cl.
*B60T 13/74* (2006.01)
*B60T 17/22* (2006.01)

(52) U.S. Cl.
CPC .......... *B60T 13/741* (2013.01); *B60T 17/221* (2013.01)

(58) Field of Classification Search
CPC ............................ B60T 13/741; B60T 17/221
See application file for complete search history.

(56) References Cited

U.S. PATENT DOCUMENTS

2022/0355771 A1* 11/2022 Fujita .................... B60T 13/741

FOREIGN PATENT DOCUMENTS

JP 2009035031 A 2/2009

OTHER PUBLICATIONS

International Search Report (PCT/ISA/210) with English translation and Written Opinion (PCT/ISA/237) mailed on Apr. 16, 2024, by the Japanese Patent Office as the International Searching Authority for International Application No. PCT/JP2024/002045, 9 pages.

* cited by examiner

*Primary Examiner* — Brodie J Follman
(74) *Attorney, Agent, or Firm* — BUCHANAN INGERSOLL & ROONEY PC

(57) ABSTRACT

A processing circuit of an electric braking device includes a base-value derivation unit configured to derive a value corresponding to a target braking force as a piston-thrust base value, a first adder configured to calibrate the piston-thrust base value so that a computational result between the calibration value and the piston-thrust base value in a case where the target braking force decreases and the target braking force becomes a prescribed braking force will be greater than a computational result between the calibration value and the piston-thrust base value in a case where the target braking force increases and the target braking force becomes a prescribed braking force, and a motor control unit configured to control the electric motor by supplying power based on the computational result by the first adder to the electric motor.

4 Claims, 7 Drawing Sheets

ELECTRIC BRAKING DEVICE

TECHNICAL FIELD

The present disclosure relates to an electric braking device including an electric motor as a power source.

BACKGROUND ART

Patent Literature 1 discloses a braking device including a booster having an electric motor as a power source. The booster includes a cylinder and a piston that moves forward and backward in the cylinder. The booster generates a hydraulic pressure corresponding to a position of the piston by moving the piston by driving the electric motor. As a result, the braking device can generate a larger braking force the higher the hydraulic pressure generated by the booster.

A control device of the braking device sets a target position of the piston based on the braking operation amount of the driver. Then, the control device feedback-controls the position of the piston based on the target position.

CITATIONS LIST

Patent Literature

Patent Literature 1: Japanese Patent Application Laid-Open No. 2009-35031

SUMMARY

Technical Problems

In the device that drives the electric motor based on the target position of the piston as described above, there is room for improvement in terms of improving the controllability of the braking force when the braking force changes from increase to decrease. Note that such a problem may similarly occur even when a target value of a parameter other than the position of the piston is set among the parameters necessary for controlling the electric motor.

Solutions to Problems

An electric braking device for solving the above problem is a device that supplies power according to a target braking force that is a target of the braking force to an electric motor so that a rotational motion of the electric motor is converted into a linear motion and transmitted to a friction material, and the friction material is pressed against a rotating body that rotates integrally with a wheel of a vehicle to generate the braking force. The electric braking device includes: a base-value derivation unit configured to derive a value corresponding to the target braking force as a drive parameter base value that is a base value of a drive parameter of the electric motor; a calibration unit configured to calibrate the drive parameter base value so that a computational result between the calibration value of the drive parameter and the drive parameter base value in a case where the target braking force decreases and the target braking force becomes a prescribed braking force will be greater than a computational result of the calibration value and the drive parameter base value in a case where the target braking force increases and the target braking force becomes the prescribed braking force; and a motor control unit configured to control the electric motor by supplying power based on a computational result by the calibration unit to the electric motor.

When the electric motor is driven, the rotational motion of the electric motor is converted into linear motion and transmitted to the friction material. When the friction material is pressed against the rotating body that rotates integrally with the wheel, a braking force corresponding to the force is generated. When the braking force increases, the friction material is compressed, so that the friction material becomes, although slightly, thin. Therefore, even if the power supply amount to the electric motor is the same, when the target braking force changes from increase to decrease, the actual value of the braking force becomes smaller than when the target braking force has increased.

In the electric braking device, even if the target braking force is the same, the calibration value of the drive parameter is changed between the case of decreasing the target braking force and the case of increasing the target braking force. That is, the computational result between the calibration value in the case of decreasing the target braking force and the drive parameter base value becomes greater than the computational result of the calibration value in the case of increasing the target braking force. Then, power based on the computational result is supplied to the electric motor. As a result, the electric braking device can improve controllability of the braking force when the target braking force changes from increase to decrease.

Note that the above-described magnitude relationship is merely a computational result by the calibration unit. Therefore, when another calibration is performed on the calibration of the drive parameter base value by the calibration unit, there is a possibility that the magnitude relationship of the supply amount to the electric motor is reversed.

DESCRIPTION OF EMBODIMENTS

Hereinafter, an embodiment of an electric braking device will be described with reference to FIGS. 1 to 6.

Figure 1:
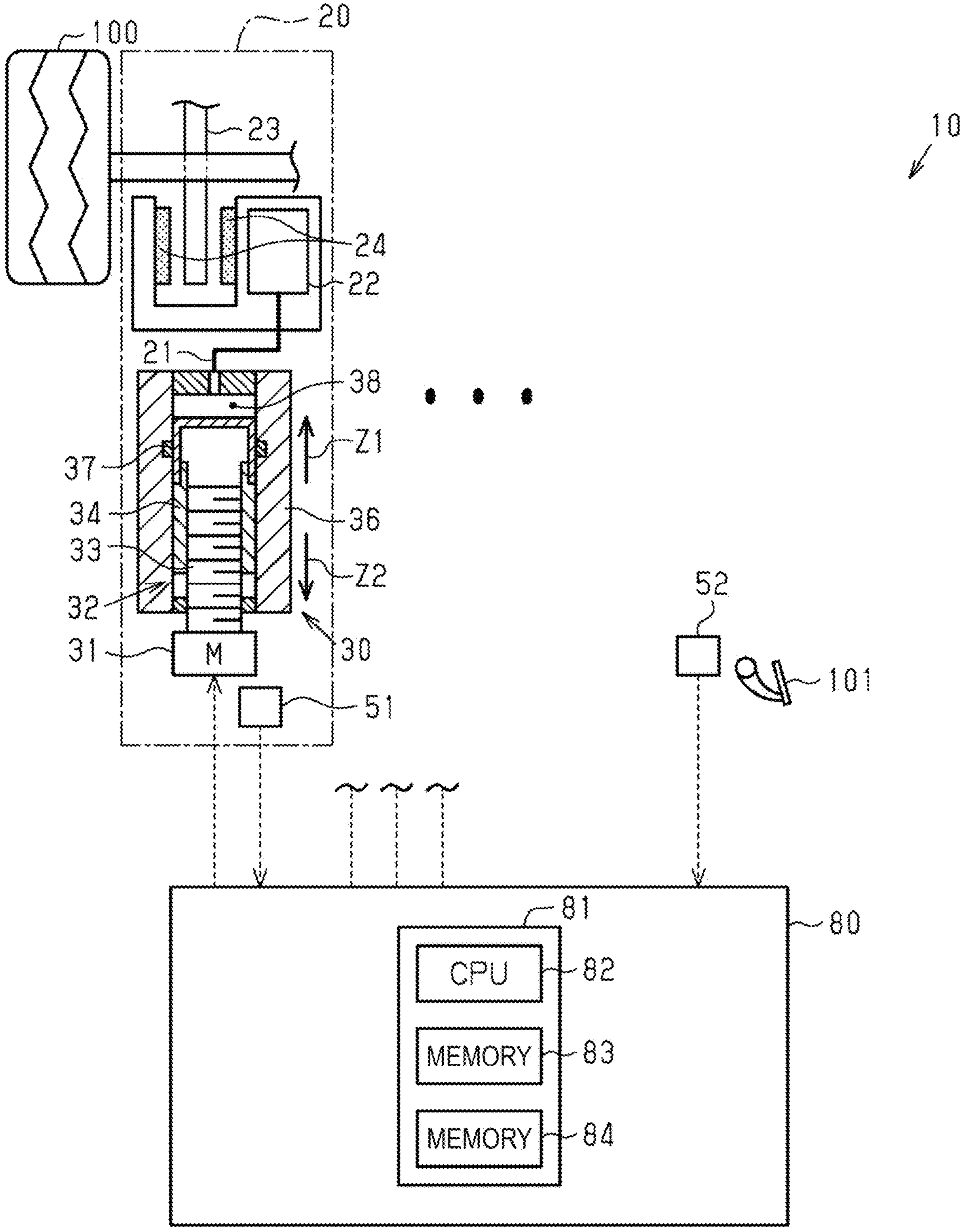
FIG. 1 is a configuration diagram schematically illustrating an electric braking device according to an embodiment.

As illustrated in FIG. 1, the electric braking device 10 includes a plurality of electric brakes 20 and a control device 80 configured to control the plurality of electric brakes 20. In the electric braking device 10, an electric brake 20 is provided for a plurality of wheels 100 of the vehicle. FIG. 1 illustrates only one wheel 100 and one electric brake 20 among the plurality of wheels 100 and the plurality of electric brakes 20.

<Electric Brake>

The electric brake 20 is a brake mechanism using an electric motor 31 as a power source. The electric brake 20 includes an electric cylinder 30, a liquid path 21, a wheel cylinder 22, a rotating body 23, and a friction material 24.

The electric cylinder 30 includes a transmission mechanism 32, a cylinder 36, and a piston 37 in addition to the electric motor 31. When a rotational motion of the electric motor 31 is input, the transmission mechanism 32 converts the rotational motion into a linear motion and outputs the linear motion. For example, the transmission mechanism 32 includes a screw mechanism. The screw mechanism may be a feed screw mechanism or a ball screw mechanism. The transmission mechanism 32 includes a rotating portion 33 that rotates in synchronization with the electric motor 31 and a linear motion portion 34 disposed coaxially with the rotating portion 33. The linear motion portion 34 linearly moves in synchronization with the rotation of the rotating portion 33. That is, the rotating portion 33 rotates in a direction conforming to the rotating direction of the electric motor 31, and the linear motion portion 34 linearly moves in a direction conforming to the rotating direction of the electric motor 31. In the example illustrated in FIG. 1, the screw corresponds to the rotating portion 33, and the nut screw-fitted to the screw corresponds to the linear motion portion 34. As the transmission mechanism, a mechanism in which a nut functions as a rotating portion and a screw functions as a linear motion portion may be adopted.

The piston 37 is disposed in the cylinder 36. The piston 37 can reciprocate along a peripheral wall of the cylinder 36. Since the piston 37 is coupled to the linear motion portion 34 of the transmission mechanism 32, it linearly moves integrally with the linear motion portion 34. Therefore, the piston 37 linearly moves in a direction conforming to the rotating direction of the electric motor 31.

In the cylinder 36, a liquid chamber 38 is defined by the piston 37. The liquid chamber 38 is filled with brake fluid. The liquid chamber 38 is always connected to the wheel cylinder 22 via the liquid path 21. Therefore, when the piston 37 linearly moves in a direction of reducing the volume of the liquid chamber 38, the brake fluid in the liquid chamber 38 is supplied to the wheel cylinder 22 through the liquid path 21. On the other hand, when the piston 37 linearly moves in a direction of increasing the volume of the liquid chamber 38, the brake fluid of the wheel cylinder 22 flows into the liquid chamber 38 through the liquid path 21. Note that the moving direction of the piston 37 that reduces the volume of the liquid chamber 38 is referred to as an "advancing direction Z1", and the direction opposite to the forward moving direction Z1 is referred to as a "retreating direction Z2". The retreating direction Z2 is also a moving direction of the piston 37 that increases the volume of the liquid chamber 38.

The rotating body 23 rotates integrally with the wheel 100. Therefore, when the friction material 24 is pressed against the rotating body 23, a braking force is generated at the wheel 100. When no hydraulic pressure is generated in the wheel cylinder 22, the friction material 24 is separated from the rotating body 23. When the brake fluid is supplied to the wheel cylinder 22, the friction material 24 abuts on the rotating body 23. When the hydraulic pressure of the wheel cylinder 22 increases, the force of pressing the friction material 24 against the rotating body 23 increases, so that the braking force increases.

That is, in the electric brake 20, when power is supplied to the electric motor 31, the rotational motion of the electric motor 31 is converted into linear motion and transmitted to the friction material 24. Then, when the friction material 24 is pressed against the rotating body 23, a braking force is generated at the wheel 100.

<Detection System>

A signal is input to the control device 80 from a detection system. The detection system includes a plurality of types of sensors. The plurality of types of sensors include a motor angle sensor 51 and a brake sensor 52. The motor angle sensor 51 detects a rotation angle of the electric motor 31 of the electric brake 20, specifically, a mechanical angle of the electric motor 31. A rotation angle of the electric motor 31 based on the output signal of the motor angle sensor 51 is referred to as a "motor rotation angle θmt". When the electric motor 31 is driven to reduce the volume of the liquid chamber 38 of the cylinder 36, the motor rotation angle θmt increases. Conversely, when the electric motor 31 is driven to increase the volume of the liquid chamber 38, the motor rotation angle θmt decreases.

The brake sensor 52 detects information on the operation of the braking operation member 101 by the driver. Examples of the brake sensor 52 include, for example, a sensor configured to detect the operation amount of the braking operation member 101 and a sensor configured to detect the operation force input from the driver to the braking operation member 101 or a correlation value thereof. Examples of the braking operation member 101 include, for example, a brake pedal and a brake lever.

<Hysteresis Characteristics of Electric Brake Caused By Friction Material>

Figure 2:
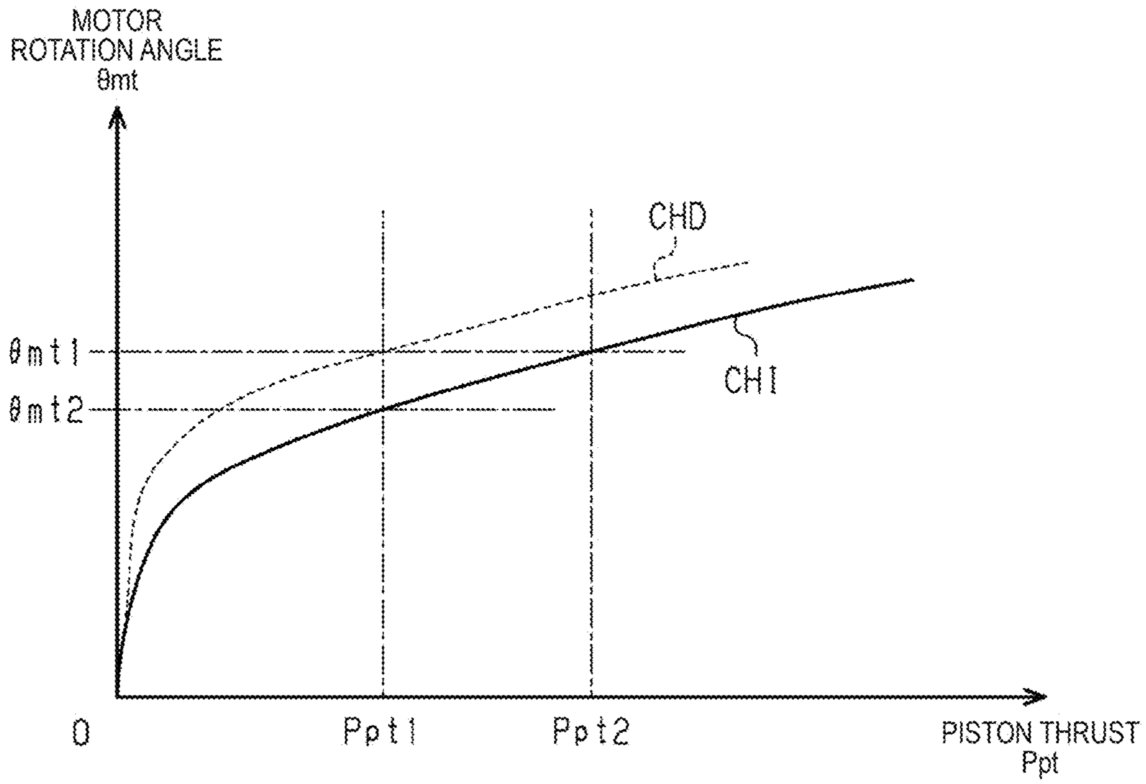
FIG. 2 is a graph illustrating an increasing characteristic that is a relationship between a piston thrust and a motor rotation angle in a case of increasing a target braking force and a decreasing characteristic that is a relationship between a piston thrust and a motor rotation angle in a case of decreasing the target braking force in the electric braking device of FIG. 1.

FIG. 2 illustrates an increasing characteristic CHI that is a relationship between the motor rotation angle θmt and the piston thrust Ppt when the braking force is increased, and a decreasing characteristic CHD that is a relationship between the motor rotation angle θmt and the piston thrust Ppt when the braking force is decreased. In FIG. 2, a solid line represents the increasing characteristic CHI, and a broken line represents the decreasing characteristic CHD. The piston thrust Ppt is the thrust of the piston 37. The piston thrust Ppt is correlated with both the force of pressing the friction material 24 against the rotating body 23 and the braking force generated at the wheel 100.

As illustrated in FIG. 2, in both the case of increasing the braking force and the case of decreasing the braking force, the piston thrust Ppt increases the larger the motor rotation angle θmt. However, the motor rotation angle θmt is different between a case where the piston thrust Ppt is increased to set the piston thrust Ppt to a first piston thrust Ppt1 and a case where the piston thrust Ppt is decreased to set the piston thrust Ppt to the first piston thrust Ppt1. Specifically, the motor rotation angle θmt (=θmt1) when the piston thrust Ppt is decreased to set the piston thrust Ppt to the first piston thrust Ppt1 is larger than the motor rotation angle θmt (=θmt2) when the piston thrust Ppt is increased to set the piston thrust Ppt to the first piston thrust Ppt1. In other words, the piston thrust Ppt (=Ppt1) in a case where the motor rotation angle θmt is decreased to set the motor rotation angle θmt to a first rotation angle θmt1 is smaller than the piston thrust Ppt (=Ppt2) in a case where the motor rotation angle θmt is increased to set the motor rotation angle θmt to the first rotation angle θmt1.

The reason the increasing characteristic CHI and the decreasing characteristic CHD are different from each other as illustrated in FIG. 2 is assumed to be for the following reason. When the motor rotation angle θmt is increased and the friction material 24 is pressed against the rotating body 23, the friction material 24 is strongly sandwiched between the piston of the wheel cylinder 22 and the rotating body 23, so that the friction material 24 becomes thinner although slightly. When the reduction of the braking force is demanded in a state where the friction material 24 is thinned in this manner, the piston thrust Ppt becomes smaller even if the motor rotation angle θmt is the same by the amount the friction material 24 is thinned.

Therefore, in the case of operating the electric brake 20 according to the target braking force FbpTr, even if the power supply amount to the electric motor 31 is the same, when the target braking force FbpTr changes from increase to decrease, the actual value of the braking force greatly decreases as compared with the case where the target braking force FbpTr is increased. Furthermore, even if the power supply amount to the electric motor 31 is the same, when the target braking force FbpTr changes from decrease to increase, the actual value of the braking force greatly increases as compared with the case where the target braking force FbpTr is decreased. That is, the electric brake 20 has a hysteresis characteristic in which the motor rotation angle θmt (i.e., the position of the piston 37) when the target braking force FbpTr decreases and the target braking force FbpTr becomes the prescribed braking force is larger than the motor rotation angle θmt (i.e., the position of the piston 37) when the target braking force FbpTr is increased and the target braking force FbpTr becomes the prescribed braking force.

<Control Device>

As illustrated in FIG. 1, the control device 80 includes a processing circuit 81. For example, the processing circuit 81 is an electronic control device. In this case, the processing circuit 81 includes a CPU 82, a memory 83, and a memory 84. The memory 83 stores a control program executed by the CPU 82. When the CPU 82 executes the control program, the processing circuit 81 operates the electric brake 20. The memory 84 stores various maps, functions, and the like referred to when operating the electric brake 20.

<Functional Unit>

Figure 3:
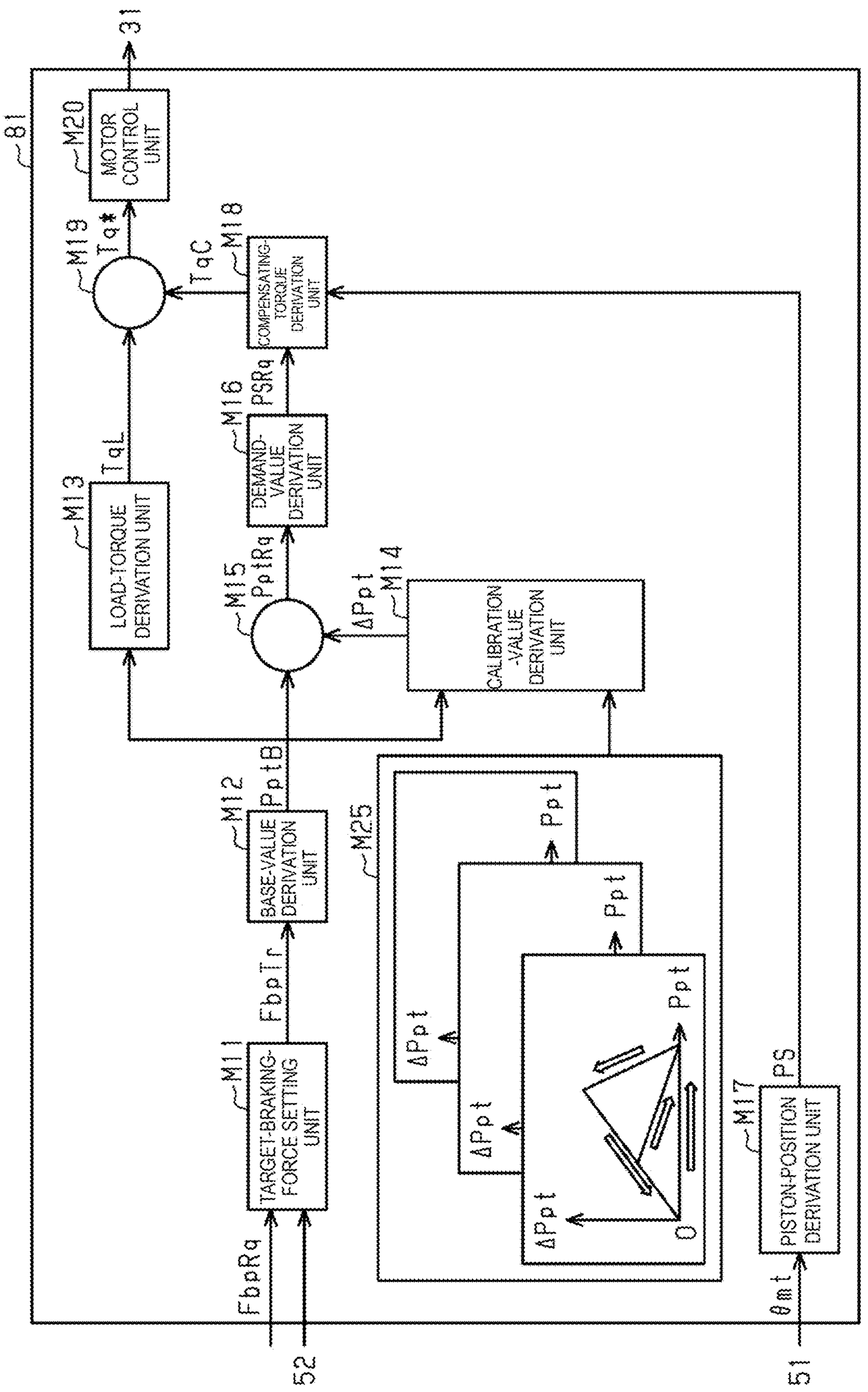
FIG. 3 is a block diagram illustrating a functional configuration of a processing circuit included in the electric braking device of FIG. 1.

As illustrated in FIG. 3, the processing circuit 81 functions as a plurality of functional units when the CPU 82 executes a control program. That is, the processing circuit 81 functions as a target-braking-force setting unit M11, a base-value derivation unit M12, a load-torque derivation unit M13, a calibration-value derivation unit M14, a first adder M15, and a demand-value derivation unit M16. Furthermore, the processing circuit 81 also functions as a piston-position derivation unit M17, a compensating-torque derivation unit M18, a second adder M19, and a motor control unit M20. In addition, a part of the storage area in the memory 84 functions as the storage unit M25.

The target-braking-force setting unit M11 sets a target braking force FbpTr which is a target of the braking force. When the driver operates the braking operation member 101, the target-braking-force setting unit M11 sets a value corresponding to the detection value of the brake sensor 52 as the target braking force FbpTr. When the braking control such as the anti-lock brake control is started, the target-braking-force setting unit M11 sets the target braking force FbpTr according to the braking control.

Note that when the vehicle is decelerated by automatic braking, the demand value FbpRq of the braking force is input to the control device 80 from another control device. In this case, the target-braking-force setting unit M11 sets the demand value FbpRq input from another control device or a value corresponding to the demand value FbpRq as the target braking force FbpTr.

The base-value derivation unit M12 derives a value corresponding to the target braking force FbpTr as a drive parameter base value which is a base value of the drive parameter of the electric motor 31. The "drive parameter" mentioned herein is a parameter necessary for driving the electric motor 31. When the drive parameter changes, the rotation angle and the output torque of the electric motor 31 change. In the present embodiment, the piston thrust corresponds to a "drive parameter". Therefore, the base-value derivation unit M12 derives the piston-thrust base value PptB, which is a base value of the piston thrust, as the drive parameter base value. The piston thrust Ppt corresponds to the actual value of the braking force. Therefore, the base-value derivation unit M12 derives a value obtained by converting the target braking force FbpTr into the piston thrust as the piston-thrust base value PptB. Note that in the present embodiment, the base-value derivation unit M12 derives the piston-thrust base value PptB based on the increasing characteristic CHI illustrated in FIG. 2.

The load-torque derivation unit M13 derives a larger value the larger the drive parameter base value as a load torque TqL of the electric motor 31. In the present embodiment, the load-torque derivation unit M13 derives a larger value the larger the piston-thrust base value PptB as the load torque TqL.

The calibration-value derivation unit M14 derives the calibration value of the drive parameter based on the transition of the drive parameter base value correlated with the target braking force FbpTr. In the present embodiment, the calibration-value derivation unit M14 derives the calibration value ΔPpt of the piston thrust based on the transition of the piston-thrust base value PptB. At this time, the calibration-value derivation unit M14 derives the calibration value ΔPpt based on the relationship stored in the storage unit M25. The processing of deriving the calibration value ΔPpt by the calibration-value derivation unit M25 including the stored content of the storage unit M14 will be described later.

The first adder M15 derives the sum of the drive parameter base value and the calibration value of the drive parameter as the demand value of the drive parameter. In the present embodiment, the first adder M15 derives the sum of the piston-thrust base value PptB and the calibration value ΔPpt as the piston thrust demand value PptRq. In this case, the piston thrust demand value PptRq corresponds to the "demand value of the drive parameter". In addition, since the sum of the piston-thrust base value PptB and the calibration value ΔPpt is the computational result between the piston-thrust base value PptB and the calibration value ΔPpt, the first adder M15 corresponds to a "calibration unit" configured to calibrate the drive parameter base value.

The demand-value derivation unit M16 derives a demand piston position PSRq that is a demand value of the position of the piston 37 based on the demand value of the drive parameter. In the present embodiment, the demand-value derivation unit M16 derives the position in the advancing direction Z1 as the demand piston position PSRq the larger the piston thrust demand value PptRq.

The piston-position derivation unit M17 derives the piston position PS, which is the current position of the piston 37. The position of the piston 37 is correlated with the motor rotation angle θmt. Therefore, the piston-position derivation unit M17 derives the piston position PS based on the motor rotation angle θmt. For example, the piston-position derivation unit M17 derives the position in the advancing direction Z1 as the piston position PS the larger the motor rotation angle θmt.

The compensating-torque derivation unit M18 derives the compensating torque TqC based on the deviation between the demand piston position PSRq and the piston position PS. At this time, the compensating-torque derivation unit M18 derives, as the compensating torque TqC, the torque of the electric motor 31 that can calibrate the gap between the demand piston position PSRq and the piston position PS. For example, the compensating-torque derivation unit M18 derives the compensating torque TqC by feedback control having the deviation between the demand piston position PSRq and the piston position PS as an input.

The second adder M19 outputs the sum of the load torque TqL and the compensating torque TqC as a command torque Tq*.

The motor control unit M20 controls the electric motor 31 based on the command torque Tq*. At this time, the motor control unit M20 drives the electric motor 31 by supplying power corresponding to the command torque Tq* to the electric motor 31. As described above, the command torque Tq* is a torque based on the drive parameter base value and the calibration value of the drive parameter. Therefore, the motor control unit M20 controls the electric motor 31 by supplying power based on the computational result by the first adder M15 (calibration unit) to the electric motor 31.

Note that another calibration may be performed on the piston thrust demand value PptRq that is the computational result between the calibration value ΔPpt and the piston thrust demand value PptRq. In this case, according to another calibration, the supply power to the electric motor 31 when the piston thrust demand value PptRq is large may be smaller than the supply power to the electric motor 31 when the piston thrust demand value PptRq is small.

<Setting Processing of Calibration Value>

The calibration-value derivation unit M14 will be described in detail.

First, an experimental result of the relationship between the piston thrust Ppt and the calibration value ΔPpt will be described with reference to FIGS. 4 and 5. The "experiment" mentioned here is an experiment for obtaining the calibration value ΔPpt at which the actual value of the braking force follows the target braking force FbpTr when the target braking force FbpTr is changed. The piston thrust Ppt is correlated with the actual value of the braking force.

Figure 4:
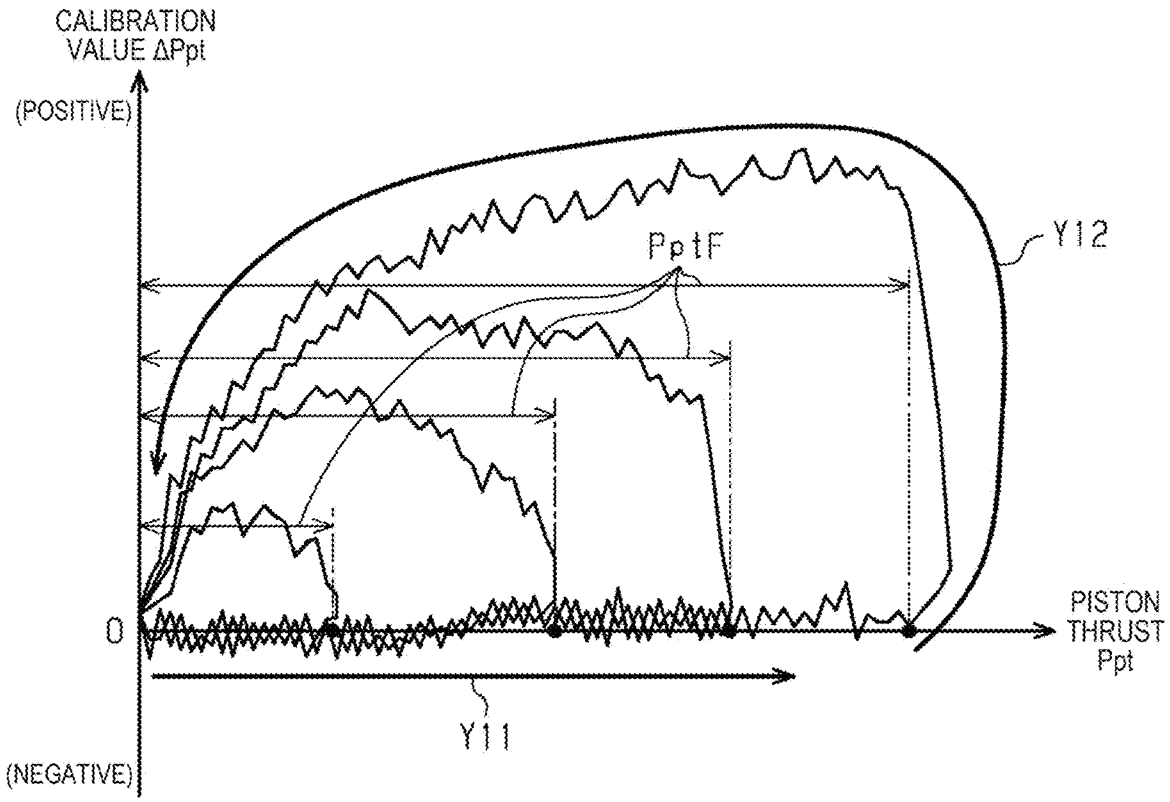
FIG. 4 is a graph showing an experimental result of a relationship between piston thrust and a calibration value when the piston thrust changes to decrease after the piston thrust is increased.
Figure 5:
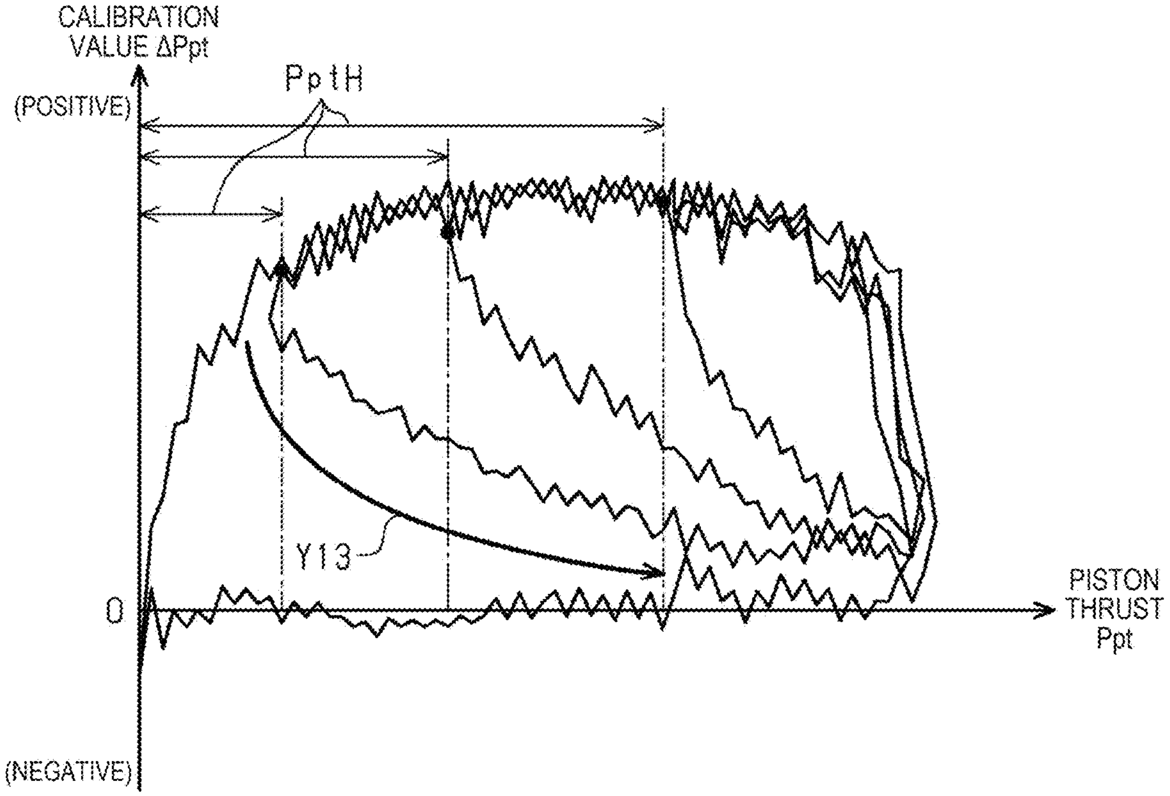
FIG. 5 is a graph showing an experimental result of a relationship between piston thrust and a calibration value in a case where the piston thrust changes to decrease after the piston thrust is increased and then the piston thrust is re-increased.

FIGS. 4 and 5 illustrate the relationship between the piston thrust Ppt and the calibration value ΔPpt obtained by the experiment. FIG. 4 illustrates a relationship between the piston thrust Ppt and the calibration value ΔPpt when the target braking force FbpTr is decreased to 0 (zero) after the target braking force FbpTr is increased from 0 (zero). The piston thrust Ppt at the time point when the piston thrust Ppt changes from increase to decrease is defined as "specified piston thrust PptF". At this time, FIG. 4 illustrates a relationship between a plurality of piston thrusts Ppt having different specified piston thrusts PptF and the calibration value ΔPpt.

As indicated by an arrow Y11 in FIG. 4, when the piston thrust Ppt is increased from 0 (zero) with the increase in the target braking force FbpTr, the relationship between the piston thrust Ppt and the motor rotation angle θmt becomes substantially the same as the increasing characteristic CHI illustrated in FIG. 2. Therefore, in this case, the calibration value ΔPpt becomes substantially 0 (zero).

When the target braking force FbpTr changes from increase to decrease, the calibration value ΔPpt is adjusted so as to fill the gap between the increasing characteristic CHI and the decreasing characteristic CHD illustrated in FIG. 2. That is, immediately after the target braking force FbpTr changes from increase to decrease, the calibration value ΔPpt increases at a substantially constant gradient with respect to the decrease in the piston thrust Ppt as indicated by an arrow Y12 in FIG. 4. As a result, the deviation between the target braking force FbpTr and the actual value of the braking force is less likely to increase. When the calibration value ΔPpt becomes large to some extent, the relationship between the piston thrust demand value PptRq and the motor rotation angle θmt becomes substantially the same as the decreasing characteristic CHD illustrated in FIG. 2. Therefore, in order to maintain a state in which the relationship between the piston thrust demand value PptRq and the motor rotation angle θmt is substantially the same as the decreasing characteristic CHD, the calibration value ΔPpt decreases according to the decrease in the piston thrust Ppt. When the target braking force FbpTr becomes 0 (zero) and the piston thrust Ppt becomes 0 (zero), the calibration value ΔPpt also becomes 0 (zero).

The calibration value ΔPpt at the time point when the calibration value ΔPpt changes from increase to decrease is referred to as an "inverted value ΔPptR". At this time, the inverted value ΔPptR changes according to the piston thrust Ppt when the piston thrust Ppt changes from increase to decrease, that is, the target braking force FbpTr. Specifically, the inverted value ΔPptR becomes larger the larger the specified piston thrust PptF. This is because the larger the piston thrust Ppt, the larger the gap between the piston thrust Ppt defined from the increasing characteristic CHI and the piston thrust Ppt defined from the decreasing characteristic CHD.

In addition, regardless of the specified piston thrust PptF, the increase gradient of the calibration value ΔPpt from the time point when the piston thrust Ppt changes from increase to decrease is substantially the same. The "increase gradient of the calibration value ΔPpt" mentioned here is an increase amount of the calibration value ΔPpt with respect to a change in the piston thrust Ppt. As the specified piston thrust PptF becomes larger, the piston thrust Ppt at the time point when the calibration value ΔPpt reaches the inverted value ΔPptR becomes larger.

FIG. 5 also illustrates the relationship between the piston thrust Ppt and the calibration value ΔPpt when the target braking force FbpTr decreases after the target braking force FbpTr increases from 0 (zero) and the target braking force FbpTr re-increases in the middle of the decrease of the target braking force FbpTr. The piston thrust Ppt at the time point when the target braking force FbpTr changes from decrease to re-increase is referred to as "switching piston thrust PptH". At this time, FIG. 5 illustrates a relationship between a plurality of piston thrusts Ppt having different switching piston thrusts PptH and the calibration value ΔPpt.

When the piston thrust Ppt re-increases after the calibration value ΔPpt has reached the inverted value ΔPptR as the piston thrust Ppt decreases, the calibration value ΔPpt gradually decreases as the piston thrust Ppt increases as indicated by an arrow Y13 in FIG. 5. The decrease gradient of the calibration value ΔPpt at this time becomes smaller the smaller the switching piston thrust PptH.

From the results of the experiments illustrated in FIGS. 4 and 5, the following results were obtained for the relationship between the target braking force FbpTr (i.e., the piston thrust Ppt) and the calibration value ΔPpt.

(A1) When the target braking force FbpTr decreases, the calibration value ΔPpt becomes larger than when the target braking force FbpTr increases.

(A2) When the target braking force FbpTr changes from increase to decrease, the calibration value ΔPpt becomes larger according to the decrease of the target braking force FbpTr. However, when the target braking force FbpTr is decreased even after the calibration value ΔPpt has reached the inverted value ΔPptR, the calibration value ΔPpt becomes smaller according to the decrease in the target braking force FbpTr.

(A3) The inverted value ΔPptR is larger the larger the specified piston thrust PptF.

(A4) When the target braking force FbpTr shifts from the decrease to the re-increase, the calibration value ΔPpt becomes smaller according to the increase in the target braking force FbpTr. The decrease gradient of the calibration value ΔPpt at this time becomes larger the larger the switching piston thrust PptH.

Figure 6:
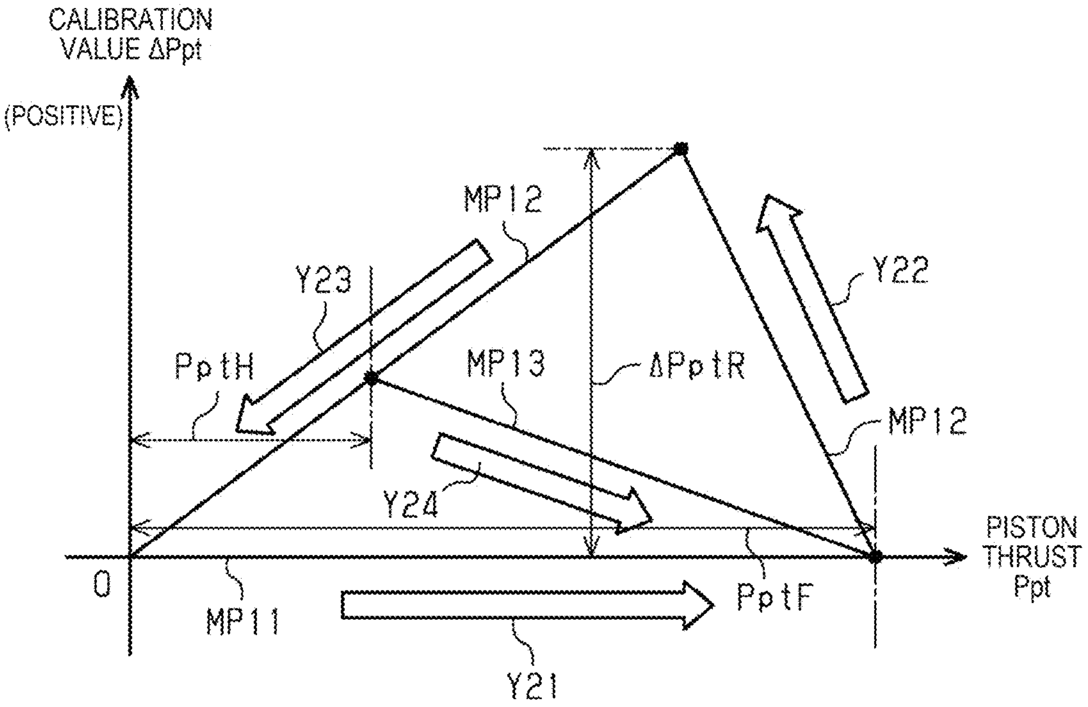
FIG. 6 is a diagram illustrating a map used when setting a calibration value.

Therefore, in the present embodiment, a map as illustrated in FIG. 6 is stored in the storage unit M25. An increasing map MP11 indicates the relationship between the piston thrust Ppt and the calibration value ΔPpt when the target braking force FbpTr is increased from 0 (zero). According to the increasing map MP11, the calibration value ΔPpt is held at 0 (zero) even when the piston thrust Ppt is increased as indicated by an arrow Y21 in FIG. 6.

A decreasing map MP12 indicates the relationship between the piston thrust Ppt and the calibration value ΔPpt when the target braking force FbpTr changes from increase to decrease. According to the decreasing map MP12, immediately after the piston thrust Ppt changes from increase to decrease, the calibration value ΔPpt increases as the piston thrust Ppt decreases as indicated by an arrow Y22 in FIG. 6. An increase gradient of the calibration value ΔPpt, which is an increase amount of the calibration value ΔPpt with respect to the decrease in the piston thrust Ppt at this time, is also referred to as a "first gradient".

Furthermore, in the decreasing map MP12, a larger value is set as the inverted value ΔPptR the larger the specified piston thrust PptF. In the decreasing map MP12, when the calibration value ΔPpt reaches the inverted value ΔPptR by the decrease in the piston thrust Ppt, the calibration value ΔPpt becomes smaller toward 0 (zero) as the piston thrust Ppt decreases as indicated by an arrow Y23 in FIG. 6. In the present embodiment, a decrease gradient of the calibration value ΔPpt, which is a decrease amount of the calibration value ΔPpt with respect to the decrease in the piston thrust Ppt, is constant. The decrease gradient of the calibration value ΔPpt at this time is also referred to as a "second gradient".

A re-increasing map MP13 indicates the relationship between the piston thrust Ppt and the calibration value ΔPpt when the target braking force FbpTr changes from decrease to re-increase. According to the re-increasing map MP13, as indicated by an arrow Y24 in FIG. 6, the calibration value ΔPpt becomes smaller toward 0 (zero) as the piston thrust Ppt increases. Specifically, the calibration value ΔPpt becomes smaller according to an increase in the piston thrust Ppt so that the calibration value ΔPpt becomes 0 (zero) when the piston thrust Ppt becomes the specified piston thrust PptF. A change gradient of the calibration value ΔPpt, which is a decrease amount of the calibration value ΔPpt with respect to the increase in the piston thrust Ppt at this time, is constant.

Note that the storage unit M25 stores a plurality of maps in advance as illustrated in FIG. 3. For example, a map for each specified piston thrust PptF at the time point when the target braking force FbpTr changes from increase to decrease is stored in the storage unit M25.

The calibration-value derivation unit M14 acquires the piston-thrust base value PptB at the time point when the target braking force FbpTr changes from increase to decrease as the specified piston thrust PptF. The calibration-value derivation unit M14 selects the decreasing map MP12 corresponding to the specified piston thrust PptF. When the piston-thrust base value PptB decreases, the calibration-value derivation unit M14 derives a value corresponding to the piston-thrust base value PptB at that time as the calibration value ΔPpt based on the selected decreasing map MP12.

Furthermore, when the target braking force FbpTr changes from decrease to re-increase, the calibration-value derivation unit M14 acquires the piston-thrust base value PptB at that time as the switching piston thrust PptH. The calibration-value derivation unit M14 selects the re-increasing map MP13 corresponding to the switching piston thrust PptH. When the piston-thrust base value PptB increases again, the calibration-value derivation unit M14 derives a value corresponding to the piston-thrust base value PptB at that time as the calibration value ΔPpt based on the selected re-increasing map MP13.

When the calibration-value derivation unit M14 derives the calibration value ΔPpt as described above, the first adder M15 corresponding to the calibration unit calibrates the piston-thrust base value PptB using the calibration value ΔPpt. Specifically, the first adder M15 calibrates the piston-thrust base value PptB so that the computational result between the calibration value ΔPpt and the piston-thrust base value PptB in a case where the target braking force FbpTr decreases and the target braking force FbpTr becomes a prescribed braking force will be greater than the computational result between the calibration value ΔPpt and the piston-thrust base value PptB in a case where the target braking force FbpTr increases and the target braking force FbpTr becomes a prescribed braking force.

Operation of Present Embodiment

The operation of the electric braking device 10 will be described with reference to FIG. 6.

The processing circuit 81 functions as the target-braking-force setting unit M11 to set the target braking force FbpTr. Subsequently, the processing circuit 81 functions as the base-value derivation unit M12 to derive a value corresponding to the target braking force FbpTr as the piston-thrust base value PptB. The processing circuit 81 functions as the load-torque derivation unit M13 to derive a value corresponding to the piston-thrust base value PptB as the load torque TqL.

Furthermore, the processing circuit 81 functions as the calibration-value derivation unit M14 to derive the calibration value ΔPpt. At this time, the processing circuit 81 derives the calibration value ΔPpt using the map (i.e., the relationship between the motor rotation angle θmt and the piston thrust Ppt) stored in the memory 84.

Specifically, as illustrated in FIG. 6, when the piston-thrust base value PptB correlated with the target braking force FbpTr increases from 0 (zero), the processing circuit 81 derives a value corresponding to the piston-thrust base value PptB as the calibration value ΔPpt based on the increasing map MP11. In the present embodiment, when the piston-thrust base value PptB increases from 0 (zero), the processing circuit 81 holds the calibration value ΔPpt at 0 (zero) even if the piston-thrust base value PptB is increased as indicated by an arrow Y21 in FIG. 6.

When the piston-thrust base value PptB changes from increase to decrease, the processing circuit 81 derives a value corresponding to the piston-thrust base value PptB as the calibration value ΔPpt based on the decreasing map MP12. At this time, the processing circuit 81 increases the calibration value ΔPpt according to the decrease in the piston-thrust base value PptB as indicated by an arrow Y22 in FIG. 6 by using the decreasing map MP12 corresponding to the specified piston thrust PptF.

When the calibration value ΔPpt reaches the inverted value ΔPptR in a situation where the piston-thrust base value PptB is decreasing, the processing circuit 81 decreases the calibration value ΔPpt according to the decrease in the piston-thrust base value PptB as indicated by an arrow Y23 in FIG. 6.

Note that the inverted value ΔPptR differs depending on the decreasing map MP12 selected by the processing circuit 81, that is, the specified piston thrust PptF. Therefore, by functioning as the calibration-value derivation unit M14, the processing circuit 81 can be said to set a larger value as the inverted value ΔPptR the larger the specified piston thrust PptF.

When the piston-thrust base value PptB changes from decrease to re-increase, the processing circuit 81 derives a value corresponding to the piston-thrust base value PptB as the calibration value ΔPpt based on the re-increasing map MP13. At this time, the processing circuit 81 selects the re-increasing map MP13 corresponding to the switching piston thrust PptH. Then, the processing circuit 81 decreases the calibration value ΔPpt according to the increase in the piston-thrust base value PptB as indicated by an arrow Y24 in FIG. 6 by using the re-increasing map MP13.

Note that when the calibration value ΔPpt set using the re-increasing map MP13 becomes 0 (zero), the processing circuit 81 switches the map from the re-increasing map MP13 to the increasing map MP11. Then, the processing circuit 81 derives the calibration value ΔPpt using the increasing map MP11.

Here, under a situation where the calibration value ΔPpt is set according to the decreasing map MP12, the piston-thrust base value PptB may change from decrease to re-increase before the calibration value ΔPpt reaches the inverted value ΔPptR. In this case, the processing circuit 81 uses the decreasing map MP12 to derive a value corresponding to the piston-thrust base value PptB at that time as the calibration value ΔPpt. As a result, the processing circuit 81 can increase the calibration value ΔPpt according to an increase in the piston-thrust base value PptB.

The processing circuit 81 functions as the first adder M15 to derive the sum of the piston-thrust base value PptB and the calibration value ΔPpt as the piston thrust demand value PptRq. That is, the processing circuit 81 calibrates the piston-thrust base value PptB using the calibration value ΔPpt. At this time, even if the target braking force FbpTr is the same, the processing circuit 81 makes the piston thrust demand value PptRq, which is the computational result between the calibration value ΔPpt and the piston-thrust base value PptB, larger when the target braking force FbpTr decreases than when the target braking force FbpTr increases.

Subsequently, the processing circuit 81 functions as the piston-position derivation unit M17 to derive the current piston position PS. The processing circuit 81 functions as a compensating-torque derivation unit M18 to derive the compensating torque TqC based on the deviation between the demand piston position PSRq and the piston position PS.

The processing circuit 81 functions as the second adder M19 to output the sum of the load torque TqL and the compensating torque TqC as the command torque Tq*. The processing circuit 81 functions as the motor control unit M20 to control the electric motor 31 based on the command torque Tq*. At this time, the processing circuit 81 adjusts the motor rotation angle θmt by supplying power based on the command torque Tq* to the electric motor 31.

Here, the supply power to the electric motor 31 increases as the command torque Tq* increases. Furthermore, the command torque Tq* is a value reflecting the calibration value ΔPpt. Therefore, the supply power to the electric motor 31 increases as the calibration value ΔPpt increases. Therefore, the processing circuit 81 makes the calibration amount of the supply power when the piston-thrust base value PptB decreases and the piston-thrust base value PptB becomes the predetermined value larger than the calibration amount when the piston-thrust base value PptB increases and the piston-thrust base value PptB becomes the predetermined value.

That is, in the electric braking device 10, even if the target braking force FbpTr is the same, the calibration amount of the power supplied to the electric motor 31 is changed between the case of decreasing the target braking force FbpTr and the case of increasing the target braking force FbpTr. That is, the calibration amount in the case of decreasing the target braking force FbpTr is larger than the calibration amount in the case of increasing the target braking force FbpTr. As a result, the electric braking device 10 can improve the controllability of the braking force after the target braking force FbpTr changes from increase to decrease.

The present embodiment can further obtain the following effects.

(1) When the target braking force FbpTr changes from decrease to re-increase, the processing circuit 81 switches from the decreasing map MP12 to the re-increasing map MP13, and derives the calibration value ΔPpt using the re-increasing map MP13. As a result, the supply power to the electric motor 31 when the target braking force FbpTr is re-increased is appropriately calibrated. Therefore, in the electric braking device 10, the controllability of the braking force when the target braking force FbpTr changes from decrease to re-increase can be improved.

(2) The processing circuit 81 derives the calibration value ΔPpt using the map stored in the storage unit M25. As a result, the processing circuit 81 can derive the calibration value ΔPpt earlier than a case where the calibration value ΔPpt is derived by calculation. Therefore, in the electric braking device 10, the controllability of the braking force can be enhanced.

(3) The processing circuit 81 derives a calibration value ΔPpt of when the piston-thrust base value PptB decreases by using the decreasing map MP12 corresponding to the specified piston thrust PptF. As a result, the electric braking device 10 can accurately derive the calibration value ΔPpt, so that the controllability of the braking force can be improved.

(4) Since the processing circuit 81 selects the decreasing map MP12 corresponding to the specified piston thrust PptF, a value corresponding to the specified piston thrust PptF can be set as the inverted value ΔPptR. Since the inverted value ΔPptR can be appropriately set in this manner, in the electric braking device 10, the controllability of the braking force when decreasing the target braking force FbpTr can be improved.

MODIFIED EXAMPLE

The present embodiment can be modified and implemented as follows. The present embodiment and the following modified examples can be implemented in combination with each other within a technically consistent scope.

Figure 7:
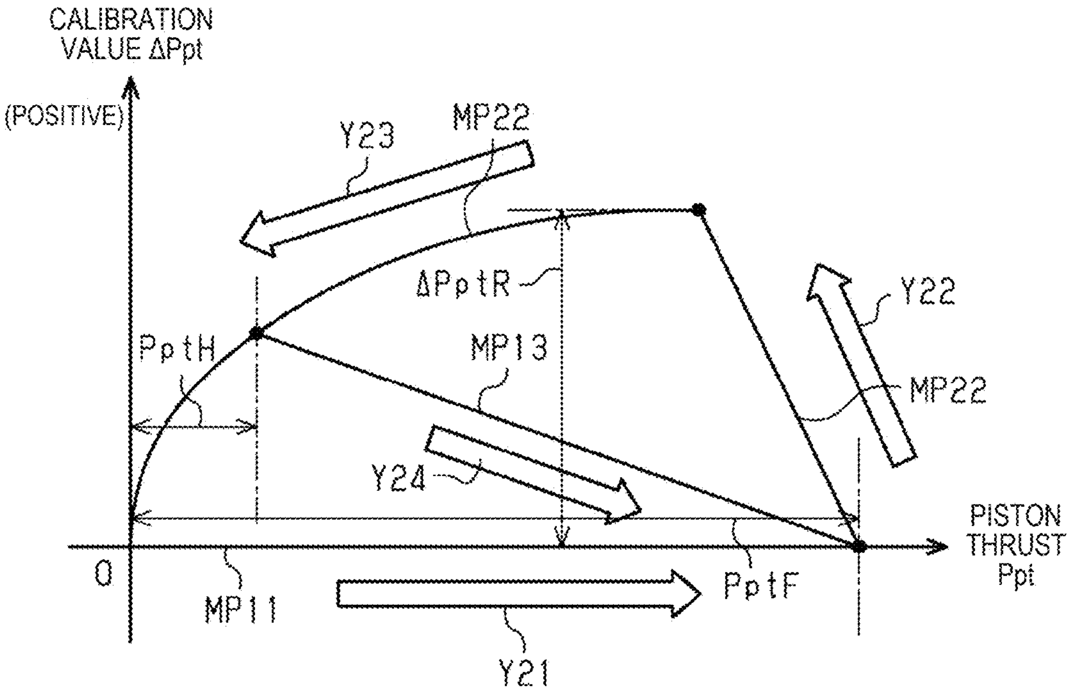
FIG. 7 is a diagram illustrating a modified example of a map used when setting a calibration value.

As the decreasing map, a decreasing map MP22 illustrated in FIG. 7 may be adopted. In this case, after the calibration value ΔPpt reaches the inverted value ΔPptR in accordance with the decrease in the piston-thrust base value PptB, the decrease gradient of the calibration value ΔPpt gradually increases as the piston-thrust base value PptB decreases. The decrease gradient of the calibration value ΔPpt is a decrease amount of the calibration value ΔPpt with respect to the decrease in the piston-thrust base value PptB. By using the decreasing map MP22, the electric braking device 10 can accurately set the piston thrust demand value PptRq. As a result, the electric braking device 10 can enhance the controllability of the braking force when decreasing the target braking force FbpTr.

In the above-described embodiment, the base-value derivation unit M12 derives the piston-thrust base value PptB based on the increasing characteristic CHI illustrated in FIG. 2, but this is not the sole case.

Figure 8:
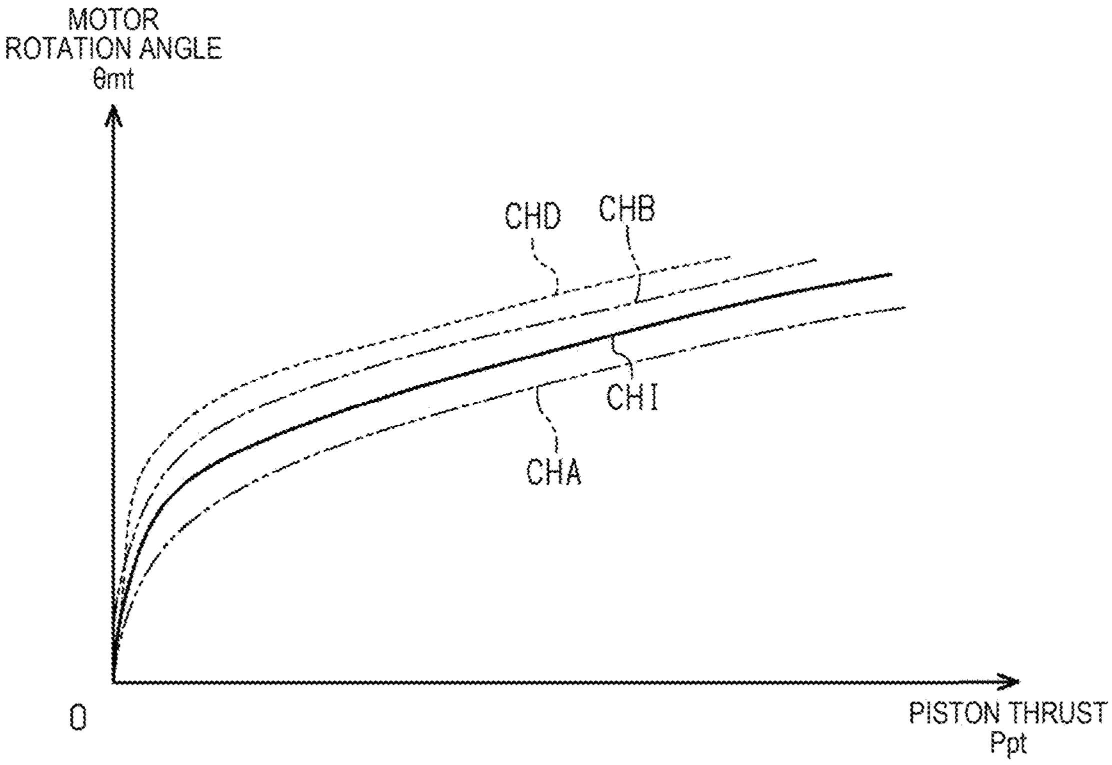
FIG. 8 is a graph showing the increasing characteristic, the decreasing characteristic, a first characteristic, and a second characteristic in the electric braking device of FIG. 1.

(B1) The base-value derivation unit M12 may derive the piston-thrust base value PptB based on, for example, a first characteristic CHA illustrated in FIG. 8. The motor rotation angle θmt according to the piston thrust Ppt that can be derived using the first characteristic CHA is smaller than the motor rotation angle θmt according to the piston thrust Ppt that can be derived using the increasing characteristic CHI. Therefore, the calibration-value derivation unit M14 derives a positive value as the calibration value ΔPpt even when the target braking force FbpTr is increased.

Figure 9:
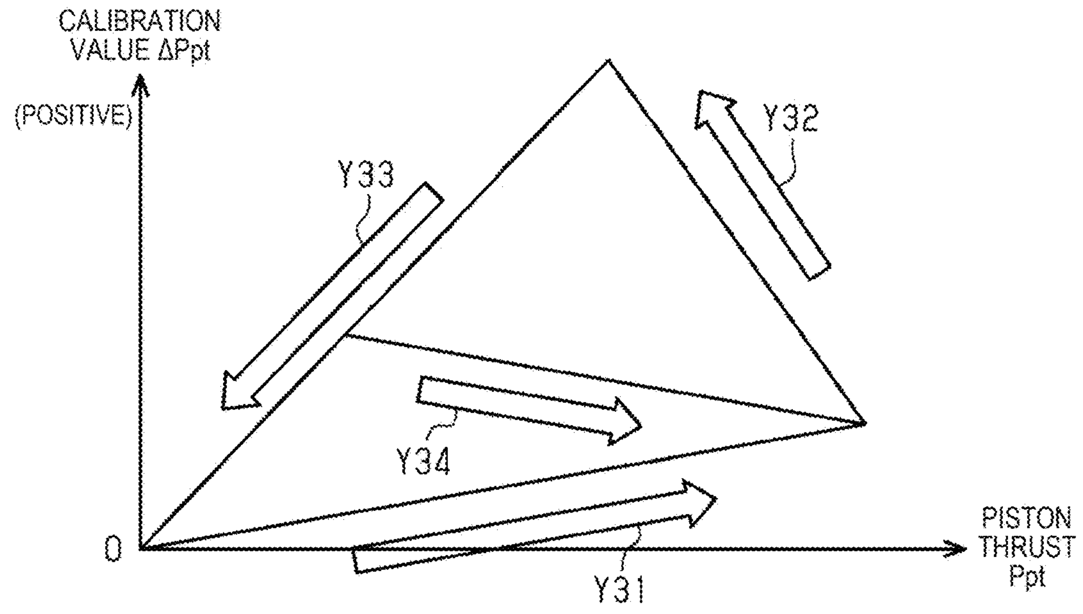
FIG. 9 is a diagram illustrating a map used when the piston-thrust base value is derived based on the first characteristic of FIG. 8.

For example, the calibration-value derivation unit M14 may derive the calibration value ΔPpt as illustrated in FIG. 9. That is, when the piston-thrust base value PptB increases as indicated by an arrow Y31 in FIG. 9, the calibration-value derivation unit M14 increases the calibration value ΔPpt according to the increase in the piston-thrust base value PptB. When the piston-thrust base value PptB changes from increase to decrease, the calibration-value derivation unit M14 increases the calibration value ΔPpt according to the decrease in the piston-thrust base value PptB as indicated by an arrow Y32 in FIG. 9. After the calibration value ΔPpt reaches the inverted value ΔPptR, the calibration-value derivation unit M14 decreases the calibration value ΔPpt according to the decrease in the piston-thrust base value PptB as indicated by an arrow Y33 in FIG. 9. When the piston-thrust base value PptB changes from decrease to re-increase, the calibration-value derivation unit M14 decreases the calibration value ΔPpt according to the increase in the piston-thrust base value PptB as indicated by an arrow Y34 in FIG. 9.

Even in this case, the calibration-value derivation unit M14 can derive the calibration value ΔPpt so that the calibration value in a case where the target braking force FbpTr decreases and the target braking force FbpTr becomes the prescribed braking force becomes larger than the calibration value in a case where the target braking force FbpTr increases and the target braking force FbpTr becomes the prescribed braking force. As a result, the first adder M15 calibrates the piston-thrust base value PptB so that the computational result between the calibration value ΔPpt and the piston-thrust base value PptB in a case where the target braking force FbpTr decreases and the target braking force FbpTr becomes a prescribed braking force will be greater than the computational result between the calibration value ΔPpt and the piston-thrust base value PptB in a case where the target braking force FbpTr increases and the target braking force FbpTr becomes a prescribed braking force.

(B2) The base-value derivation unit M12 may derive the piston-thrust base value PptB based on, for example, a second characteristic CHB illustrated in FIG. 8. The motor rotation angle θmt according to the piston thrust Ppt that can be derived using the second characteristic CHB is larger than the motor rotation angle θmt according to the piston thrust Ppt that can be derived using the increasing characteristic CHI. On the other hand, the motor rotation angle θmt corresponding to the piston thrust Ppt that can be derived using the second characteristic CHB is smaller than the motor rotation angle θmt corresponding to the piston thrust Ppt that can be derived using the decreasing characteristic CHD. Therefore, the calibration-value derivation unit M14 derives a negative value as the calibration value ΔPpt when the target braking force FbpTr is increased, and derives a positive value as the calibration value ΔPpt when the target braking force FbpTr is decreased.

Figure 10:
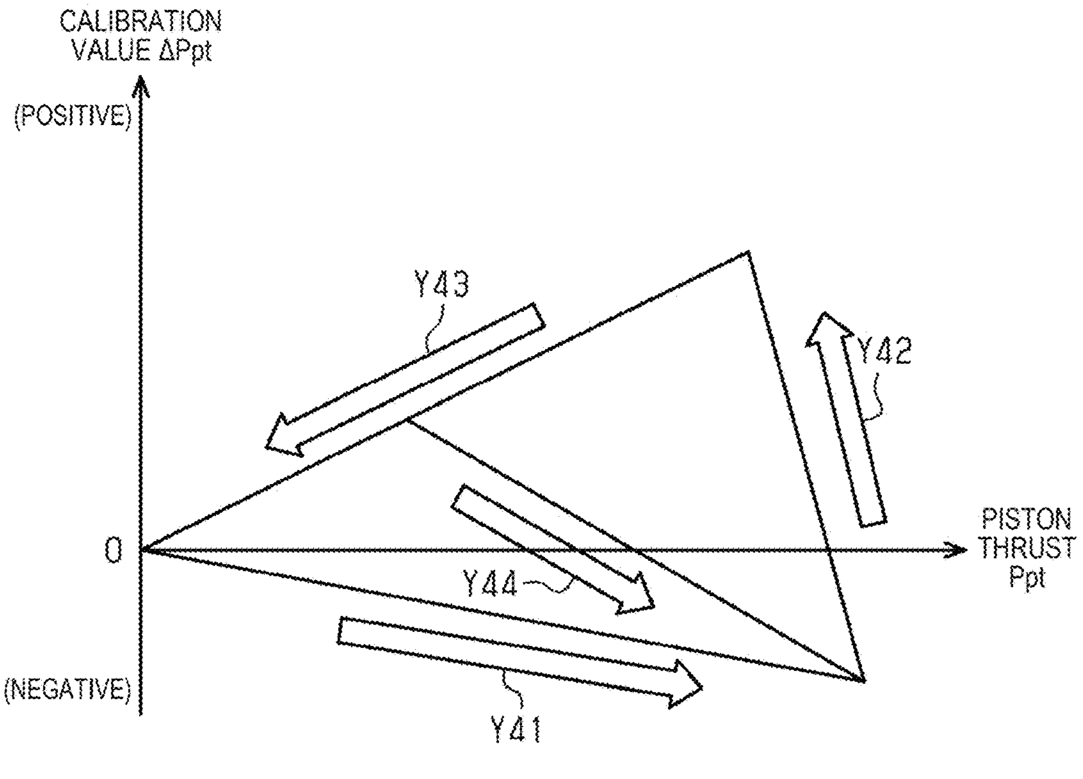
FIG. 10 is a diagram illustrating a map used when the piston-thrust base value is derived based on the second characteristic of FIG. 8.

For example, the calibration-value derivation unit M14 may derive the calibration value ΔPpt as illustrated in FIG. 10. That is, when the piston-thrust base value PptB increases as indicated by an arrow Y41 in FIG. 10, the calibration-value derivation unit M14 decreases the calibration value ΔPpt according to the increase in the piston-thrust base value PptB. As a result, the calibration-value derivation unit M14 can set a negative value as the calibration value ΔPpt. When the piston-thrust base value PptB changes from increase to decrease, the calibration-value derivation unit M14 increases the calibration value ΔPpt according to the decrease in the piston-thrust base value PptB as indicated by an arrow Y42 in FIG. 10. As a result, the calibration-value derivation unit M14 can make the calibration value ΔPpt larger than that before the piston-thrust base value PptB changes to decrease. After the calibration value ΔPpt reaches the inverted value ΔPptR, the calibration-value derivation unit M14 decreases the calibration value ΔPpt according to the decrease in the piston-thrust base value PptB as indicated by an arrow Y43 in FIG. 10. When the piston-thrust base value PptB changes from decrease to re-increase, the calibration-value derivation unit M14 decreases the calibration value ΔPpt according to the increase in the piston-thrust base value PptB as indicated by an arrow Y44 in FIG. 10.

Even in this case, the calibration-value derivation unit M14 can derive the calibration value ΔPpt so that the calibration value in a case where the target braking force FbpTr decreases and the target braking force FbpTr becomes the prescribed braking force becomes larger than the calibration value in a case where the target braking force FbpTr increases and the target braking force FbpTr becomes the prescribed braking force. As a result, the first adder M15 calibrates the piston-thrust base value PptB so that the computational result between the calibration value ΔPpt and the piston-thrust base value PptB in a case where the target braking force FbpTr decreases and the target braking force FbpTr becomes a prescribed braking force will be greater than the computational result between the calibration value ΔPpt and the piston-thrust base value PptB in a case where the target braking force FbpTr increases and the target braking force FbpTr becomes a prescribed braking force.

(B3) The base-value derivation unit M12 may derive the piston-thrust base value PptB based on the decreasing characteristic CHD illustrated in FIG. 2. The motor rotation angle θmt corresponding to the piston thrust Ppt that can be derived using the decreasing characteristic CHD is larger than the motor rotation angle θmt corresponding to the piston thrust Ppt that can be derived using the increasing characteristic CHI. Therefore, the calibration-value derivation unit M14 derives a value of less than or equal to 0 (zero) as the calibration value ΔPpt.

For example, when the piston-thrust base value PptB increases, the calibration-value derivation unit M14 derives a negative value as the calibration value ΔPpt. Specifically, the calibration-value derivation unit M14 decreases the calibration value ΔPpt according to an increase in the piston-thrust base value PptB. When the piston-thrust base value PptB changes from increase to decrease, the calibration-value derivation unit M14 increases the calibration value ΔPpt according to a decrease in the piston-thrust base value PptB. After the calibration value ΔPpt reaches the inverted value ΔPptR according to the decrease in the piston-thrust base value PptB, the calibration-value derivation unit M14 decreases the change gradient of the calibration value ΔPpt that is the amount of change in the calibration value ΔPpt with respect to the decrease in the piston-thrust base value PptB. Even in this case, the calibration-value derivation unit M14 can derive the calibration value ΔPpt so that the calibration value in a case where the target braking force FbpTr decreases and the target braking force FbpTr becomes the prescribed braking force becomes larger than the calibration value in a case where the target braking force FbpTr increases and the target braking force FbpTr becomes the prescribed braking force. As a result, the first adder M15 calibrates the piston-thrust base value PptB so that the computational result between the calibration value ΔPpt and the piston-thrust base value PptB in a case where the target braking force FbpTr decreases and the target braking force FbpTr becomes a prescribed braking force will be greater than the computational result between the calibration value ΔPpt and the piston-thrust base value PptB in a case where the target braking force FbpTr increases and the target braking force FbpTr becomes a prescribed braking force.

(B4) The base-value derivation unit M12 may increase the supply power to the electric motor 31 when the piston-thrust base value PptB increases, and may derive the piston-thrust base value PptB so as to decrease the supply power when the piston-thrust base value PptB decreases.

The processing circuit 81 may calibrate the drive parameters of the electric motor 31 other than the piston thrust Ppt according to the transition of the target braking force FbpTr. Examples of other drive parameters other than the piston thrust Ppt include, for example, the target braking force FbpTr, the piston position PS, and the compensation torque TqC.

The storage unit M25 may store a function indicating the relationship by a calculation formula as the relationship between the piston-thrust base value PptB and the calibration value ΔPpt when the target braking force FbpTr increases. The function is a calculation formula that uses the piston-thrust base value PptB at that time as a variable. In this case, the calibration-value derivation unit M14 can calculate a value corresponding to the piston-thrust base value PptB as the calibration value ΔPpt by substituting the piston-thrust base value PptB at that time to the function.

The storage unit M25 may store a function indicating the relationship by a calculation formula as the relationship between the piston-thrust base value PptB and the calibration value ΔPpt when the target braking force FbpTr decreases. The function is a calculation formula using the piston-thrust base value PptB at the time point when the piston-thrust base value PptB changes from increase to decrease and the piston-thrust base value PptB at that time as variables. In this case, the calibration-value derivation unit M14 substitutes the piston-thrust base value PptB at the time point when the piston-thrust base value PptB changes from increase to decrease and the piston-thrust base value PptB at that time into the function. As a result, the calibration-value derivation unit M14 can calculate a value corresponding to the piston-thrust base value PptB as the calibration value ΔPpt.

The processing circuit 81 can be configured as a circuit including one or more processors operating according to a computer program, one or more dedicated hardware circuits such as dedicated hardware that executes processing of at least a part of various processing, or a combination thereof. Examples of the dedicated hardware include, for example, an ASIC which is an application specific integrated circuit. The processor includes a CPU and a memory such as a RAM and a ROM, and the memory stores a program code or a command configured to cause the CPU to execute processing. The memory, that is, the storage medium includes any available medium accessible by a general purpose or dedicated computer.

The electric brake may not be the brake mechanism including the electric cylinder as illustrated in FIG. 1 as long as it is a brake mechanism capable of adjusting the braking force by controlling the motor rotation angle θmt. For example, the electric brake may be a dry electric brake capable of pressing the piston directly against the friction material.

Next, a technical idea that can be grasped from the above embodiment and the modified examples will be described.

(a) The calibration-value derivation unit preferably decreases the calibration value according to an increase in the target braking force when the target braking force changes from decrease to re-increase after the target braking force changes from increase to decrease.

(b) The friction material has a hysteresis characteristic in which an actual value of the braking force when the target braking force decreases and the target braking force becomes a prescribed braking force is smaller than an actual value of the braking force when the target braking force increases and the target braking force becomes the prescribed braking force.

Note that the expression "at least one" as used in the present specification means "one or more" of the desired options. As an example, the expression "at least one" as used in the present specification means "only one option" or "both of two options" if the number of options is two. As another example, the expression "at least one" as used in the present specification means "only one option" or "a combination of two or more arbitrary options" if the number of options is three or more.

The invention claimed is:

1. An electric braking device configured to supply power corresponding to a target braking force that is a target of a braking force to an electric motor so that a rotational motion of the electric motor is converted into a linear motion and transmitted to a friction material, and the friction material is pressed against a rotating body that rotates integrally with a wheel of a vehicle to generate a braking force, the electric braking device comprising:

a base-value derivation unit configured to derive a value corresponding to the target braking force as a drive parameter base value that is a base value of a drive parameter of the electric motor;

a calibration unit configured to calibrate the drive parameter base value so that a computational result between the calibration value of the drive parameter and the drive parameter base value in a case where the target braking force decreases and the target braking force becomes a prescribed braking force will be greater than a computational result between the calibration value and the drive parameter base value in a case where the target braking force increases and the target braking force becomes the prescribed braking force; and a motor control unit configured to control the electric motor by supplying power based on a computational result by the calibration unit to the electric motor.

2. The electric braking device according to claim 1, further comprising:

a storage unit configured to store a relationship between the target braking force and the calibration value when the target braking force increases and a relationship between the target braking force and the calibration value when the target braking force decreases; and a calibration-value derivation unit configured to derive the calibration value based on the relationship stored in the storage unit.

3. The electric braking device according to claim 1, further comprising:

a calibration-value derivation unit configured to increase the calibration value according to a decrease in the target braking force when the target braking force changes from increase to decrease, and decreases the calibration value according to a decrease in the target braking force when the calibration value reaches a prescribed inverted value.

4. The electric braking device according to claim 3, wherein the calibration-value derivation unit sets a larger value as the inverted value the larger the target braking force at a time point when the target braking force changes from increase to decrease.

* * * * *